(12) United States Patent
Tabor et al.

(10) Patent No.: US 10,935,176 B1
(45) Date of Patent: Mar. 2, 2021

(54) MULTI PORT FLUID CONNECTOR

(71) Applicant: Loon LLC, Mountain View, CA (US)

(72) Inventors: Mathew Tabor, San Francisco, CA (US); Keegan Gartner, Los Gatos, CA (US)

(73) Assignee: Loon LLC, Mountain View, CA (US)

( * ) Notice: Subject to any disclaimer, the term of this patent is extended or adjusted under 35 U.S.C. 154(b) by 0 days.

(21) Appl. No.: 16/558,619

(22) Filed: Sep. 3, 2019

(51) Int. Cl.
*F16L 37/02* (2006.01)
*F16L 37/56* (2006.01)
*F16J 15/32* (2016.01)

(52) U.S. Cl.
CPC .............. *F16L 37/025* (2013.01); *F16L 37/56* (2013.01); *F16J 15/32* (2013.01)

(58) Field of Classification Search
CPC ........... F16L 37/025; F16L 37/56; F16J 15/32
USPC ....................................................... 141/383
See application file for complete search history.

(56) References Cited

U.S. PATENT DOCUMENTS

| | | | | |
|---|---|---|---|---|
| 2,349,170 A | * | 5/1944 | Jackman ................... | F16J 15/32 277/488 |
| 2,768,036 A | * | 10/1956 | Greenough .......... | F16J 15/3272 277/448 |
| 2,931,597 A | * | 4/1960 | Moore, Jr. ................ | B64B 1/58 244/97 |
| 3,378,281 A | * | 4/1968 | Smith ....................... | F16L 1/26 285/27 |
| 4,219,223 A | * | 8/1980 | Schulte .................. | E21B 33/038 285/26 |
| 4,393,674 A | * | 7/1983 | Rasmussen .......... | B21D 26/041 279/2.03 |
| 5,343,798 A | * | 9/1994 | Meisinger ........... | F16L 37/0842 277/602 |
| 5,385,169 A | * | 1/1995 | Odelius .................... | F16L 37/35 137/614.03 |
| 5,482,082 A | * | 1/1996 | Turner ................... | F16L 17/035 137/614.03 |
| 5,515,885 A | * | 5/1996 | Lanasa .................. | G01M 3/022 138/90 |
| 5,674,206 A | * | 10/1997 | Allton ................... | A61M 39/26 604/249 |

(Continued)

FOREIGN PATENT DOCUMENTS

KR    20140070427 A    6/2014

OTHER PUBLICATIONS

International Search Report and Written Opinion in International Aaplication No. PCT/US2020/048754, dated Nov. 27, 2020 (10 pages).

*Primary Examiner* — Timothy L Maust
*Assistant Examiner* — James R Hakomaki
(74) *Attorney, Agent, or Firm* — Botos Churchill IP Law

(57) ABSTRACT

Aspects of the disclosure relate to a fluid connector mechanism having an opening therethrough. The mechanism may include a connector having a connector base portion and a piston portion including a piston housing and a piston. The opening may extend from the piston portion, through the piston, and through the connector base portion. The mechanism may also include a base having first and second pairs of O-rings arranged in first and second pairs of grooves, the opening further extending from one end of the base to another. The connector base portion and the base may be configured to engage with one another and create fluid-tight seals with the O-rings while the piston is arranged outside of the base.

18 Claims, 18 Drawing Sheets

(56) References Cited

U.S. PATENT DOCUMENTS

| | | |
|---|---|---|
| 7,159,611 B2 | 1/2007 | Larsen |
| 8,122,964 B2* | 2/2012 | Judge .................. E21B 43/0107 |
| | | 166/341 |
| 9,016,634 B1* | 4/2015 | Ratner ....................... B64B 1/40 |
| | | 244/137.4 |
| 9,080,712 B2 | 7/2015 | Tiberghien et al. |
| 9,266,599 B1* | 2/2016 | Ratner ....................... B64B 1/40 |
| 10,035,576 B1* | 7/2018 | Brookes .................... B64B 1/40 |
| 10,082,209 B1* | 9/2018 | Viggiano ................. F16K 1/123 |
| 10,288,060 B2 | 5/2019 | Stobbe |
| 10,584,561 B2* | 3/2020 | Weintraub .......... F16K 11/0712 |
| 2001/0035217 A1 | 11/2001 | Horton et al. |
| 2008/0029966 A1* | 2/2008 | More ...................... F16L 37/56 |
| | | 277/322 |
| 2010/0155074 A1* | 6/2010 | Rodriguez ............ E21B 33/038 |
| | | 166/341 |
| 2012/0175124 A1* | 7/2012 | Burgon ................. E21B 33/038 |
| | | 166/343 |
| 2015/0083133 A1 | 3/2015 | Dunn et al. |
| 2016/0101367 A1 | 4/2016 | Walz et al. |
| 2018/0038539 A1 | 2/2018 | Danielson et al. |
| 2019/0211944 A1* | 7/2019 | Ismert ....................... F16K 1/12 |
| 2020/0124285 A1* | 4/2020 | Ameser ................... F16L 39/00 |

* cited by examiner

MULTI PORT FLUID CONNECTOR

BACKGROUND

Various systems, such as cranes, towing machines, and other devices, employ grabbing mechanisms to grab, hold, lift, and move objects. These mechanisms may include hooks, pneumatically operated claws or grabbers, etc. which require pneumatic connectors. These connectors are typically configured for single connection devices or rather control of a single device via a single fluid port.

BRIEF SUMMARY

Aspects of the present disclosure provide a system comprising a fluid connector mechanism having an opening therethrough. The fluid connector including a connector having a connector base portion and a piston portion including a piston housing, a piston. The opening extends from the piston portion, through the piston, and through the connector base portion. The fluid connector also includes a base having first and second pairs of O-rings arranged in first and second pairs of grooves. The opening extending from one end of the base to another, and the connector base portion and the base are configured to engage with one another and create fluid-tight seals with the O-rings while the piston is arranged outside of the base.

In one example, the piston housing includes a chamber, and the piston is arranged such that pressurizing the chamber causes the piston to move relative to the piston housing and engage the connector with the base. In another example, the connector base portion also includes first and second chambers configured to allow fluid to flow from the connector into the base when the connector is engaged with the base. In this example, the first and second fluid chambers are completely separate and do not allow for fluid to pass between the first chamber and the second chamber during operation. In addition, the connector base portion includes a chamfer and the first and second chambers include respective chamber openings arranged in the chamfer. In addition, the base includes a groove arranged in an interior surface of the base and another O-ring in the groove, and when the connector is engaged with the base, the another O-right creates a pair of separate chambers, and each of the respective chamber openings is connected to one of the pair of separate chambers. In addition, the base includes a pair of fluid ports, and each one of the pair of separate chambers is connected to a respective one of the pair of fluid ports. In some examples, the system includes a plug in one of the respective chamber openings. In some examples, the first chamber includes a first chamber opening arranged in the chamfer and the second chamber includes a second chamber opening arranged in an outer side surface of the connector base portion. In this example, the base includes a fluid port and when the connector is engaged with the base, the first chamber opening is arranged to allow fluid to flow from the first chamber opening into a chamber between the connector and the base and out of the mechanism through the fluid port. In another example, the base also includes a port positioned between the first pair of grooves, and when the connector is engaged with the base, the second chamber opening is arranged in fluid communication with the port. In another example, the base includes a groove arranged in an interior surface of the base and another O-ring in the groove. In another example, the first pair of grooves is arranged in a first interior surface of the base and the second pair of grooves is arranged in a second interior surface of the base.

In this example, the first interior surface is opposite of the second interior surface. In another example, the connector base portion includes a first chamfer and the base includes a second chamfer, and when the connector base portion is inserted into the base, the first chamfer is configured to engage with the second chamfer and thereby self-align the connector with the base. In another example, the first chamfer is an outer chamfer, the connector base portion includes a third chamfer that is an interior chamfer, the base includes a fourth chamfer, and when the connector base portion is inserted into the base, the third interior chamfer is configured to engage with the fourth chamfer and thereby self-align the connector with the base. In this example, the third chamfer is arranged to enable load distribution during operation and prevents the first and second pairs of O-rings from slipping out of the first and second pairs of grooves. In another example, the connector is configured for a blind mate connection with the base. In another example, the system also includes a balloon having a balloon envelope, and the base portion is connected to a structure which is connected to a fill port of the balloon envelope, and in operation, lift gas may be provided to the fill port via the opening and the structure.

DETAILED DESCRIPTION

Figure 1:
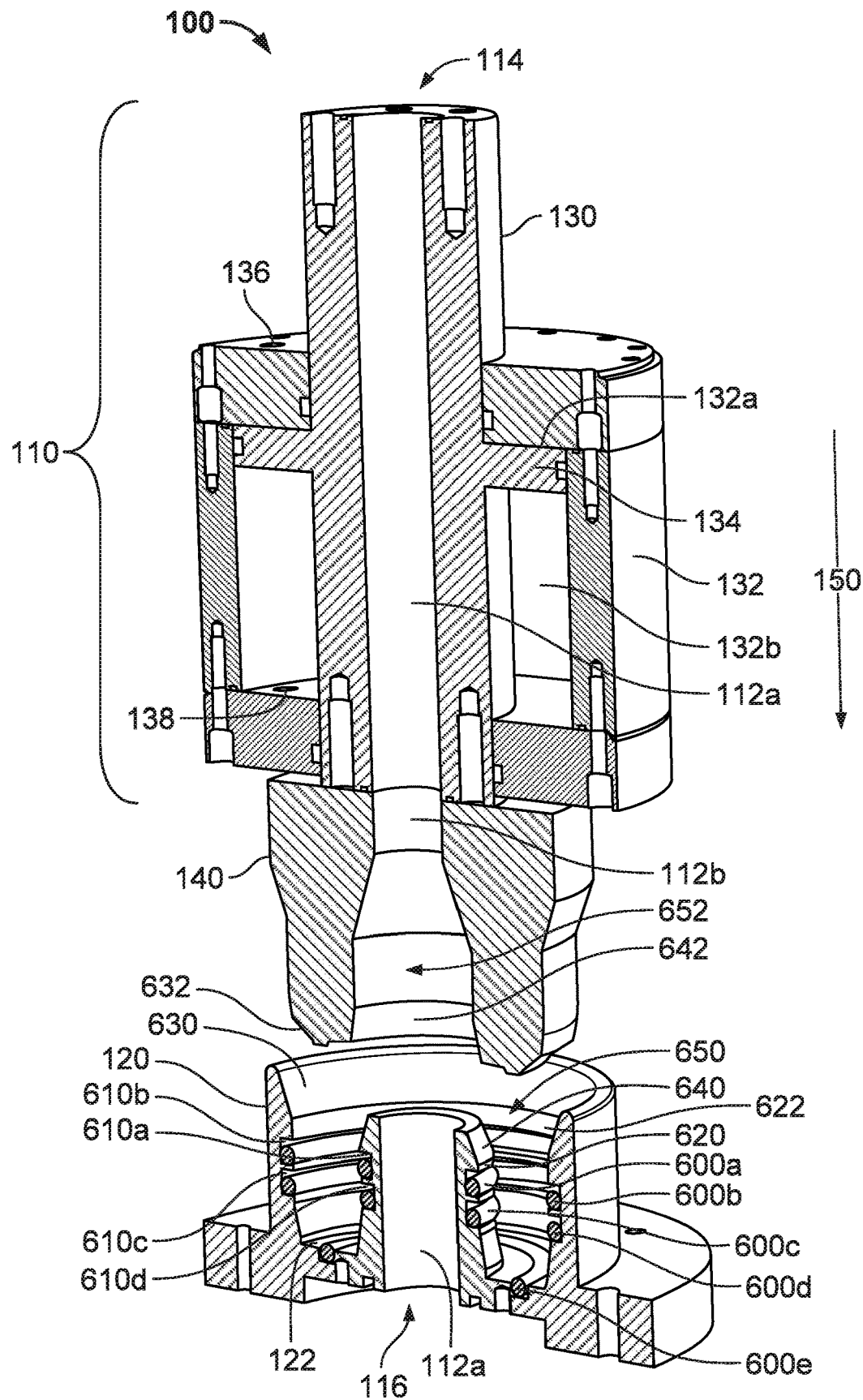
FIG. 1 is a cross-sectional view of a multi-port fluid connector mechanism for fluid routing in accordance with aspects of the disclosure.

The technology relates to a multi-port fluid connector mechanism for fluid routing. An example mechanism may include connector and a base configured to engage with one another. The connector and base are configured to pass fluid from the connector portion into and through the base portion via a plurality of individual chambers. This may enable the mechanism to supply different fluids independently from one another. Other features and benefits are discussed further below.

The connector may include two substructures: a piston portion and a connector base portion. The piston portion and the connector base portion may be attached to one another via bolts or any other connection devices or means. The connector may include an interior opening in order to enable a first fluid to pass from a first end of the connector to a second end of the connector.

The piston portion may include a cylindrical piston housing including an interior piston. The piston housing may include one or more openings which may be connected to a pressurized or compressed air source in order to move the piston relative to the piston housing. The opening that passes through the piston portion also passes through the piston. Moving the piston also changes the position of the opening relative to the piston housing.

The connector base portion may also include a pair of chambers separate from the opening. These chambers may allow fluid to enter into the connector base portion and flow into the base.

The base may include a plurality of sealing O-rings. The plurality of O-rings may include corresponding pairs of O-rings each arranged in respective grooves in opposing interior side surfaces of the base as well as a fifth O-ring arranged in a groove in a bottom interior side surface of the base. The base may also include an inward-oriented chamfer and an outward-oriented chamfer, each configured to engage with a corresponding chamfer of the connector. The base may also include a generally complementary shape with respect to the connector base portion. This may enable the O-rings to create the fluid-tight seals when the connector is engaged with the base.

The base portion may also include a pair of fluid ports which allow fluid from the chambers to exit the base portion. Once engaged with the connector, the O-ring arranged in the groove of the base interior surface may create a pair of chambers between the connector and the base. Each one of these chambers may be connected to a respective one of the pair of fluid ports as well as a respective one of the chambers of the connector base portion. In this regard, the chamber openings in the outer chamfer may align with respective chambers allowing fluid to flow from each one of the chamber openings into a respective one of the chambers.

Alternatively, rather than using an O-ring to create a pair of chambers and rather than both of the chamber openings allowing fluid to flow out of the connector at the chamfer, one of the chamber openings may be removed or blocked. In this instance, an additional chamber opening may be arranged in an outer side surface of the connector base portion. When the connector is engaged with the base, the additional chamber opening may be positioned between the pair of O-rings arranged in one of the interior surfaces of the base. In this regard, the pair of O-rings may form a fluid-tight chamber between the connector and the base. The base also includes a port to enable fluid from the chamber to exit the base.

The mechanism described herein may be utilized in any number of gas dispensing, metering or storage equipment configurations and may also be used with various other devices as described further below.

The features described herein may provide a wide range of useful benefits. For instance, the configuration of the chamfers, which enables self-aligning or centering, may minimize engagement time as well as the potential for mistakes when aligning the connector and the base with one another. Thus, the mechanism provides for precise control in imprecise environments and may be especially useful in non-precision equipment, like large cranes or where a large arm is incapable of repeatedly returning to the exact same position. In addition, because the position of the piston can be controlled via a remote air source and because the connector is self-aligning centering, operation of the mechanism may be performed remotely. The combination of the cylindrical and complementary shapes of the connector and the base as well as the aforementioned chamfers may enable the connector to be constrained in translation, pitch and yaw with respect to the base once the connector and the base are fully engaged. In other words, the seals may remain fluid-tight even when the two sides of the connector are loaded in bending or in shear. This may be especially useful for use in systems which may be subject to high side and vertical loads. In addition, the mechanism enables the use of multiple (and even different types of) fluids, minimizes engagement time as well as the potential for mistakes.

Aspects, features and advantages of the disclosure will be appreciated when considered with reference to the foregoing description of embodiments and accompanying figures. The same reference numbers in different drawings may identify the same or similar elements. Furthermore, the following description is not limiting; the scope of the present technology is defined by the appended claims and equivalents.

FIG. 1 is an example cross-sectional view of a multi-port fluid connector mechanism 100 for fluid routing. In this example, the mechanism 100 includes a connector 110 and a base 120 configured to engage with one another. The connector 110 and base 120 may be configured to pass fluid from the connector portion into and through the base portion via a plurality of individual chambers. This may enable the mechanism to supply different fluids independently from one another.

The connector 110 may include two substructures: a piston portion 130 and a connector base portion 140. The piston portion and the connector base portion may be attached to one another via bolts or any other connection devices or means. The connector 110 may include an interior opening 112 (collectively 112a in the piston portion 130, 112b in the base portion 140, and 112c in the base 120 in FIG. 1) in order to enable a first fluid to pass from a first end 114 of the connector (at the piston portion) to a second end 116 of the connector (at the connector base portion). The width of the interior opening 112 may be selected according to a flow rate and pressure of fluid to pass through the opening during use. For example, the opening may be 1 inch in diameter or more or less along portions of the opening in order to provide lift gas such as helium to a balloon envelope of a balloon. The same or other diameter sizes may be helpful for different environments or systems.

The piston portion 130 may include a piston housing 132 including an interior piston 134. In this example, the piston housing is cylindrical. The piston housing 132 may include one or more openings 136, 138 which may be connected to a pressurized or compressed air source in order to move the piston relative to the piston housing. In this regard, pressurizing a chamber 132a (see FIG. 7) or 132b in which the piston 134 (via opening 136 or 138) resides within the piston housing 132 causes the piston 134 to move relative to the piston housing. The part of the interior opening 112 that passes through the piston portion 130 also passes through the piston 134. The piston portion 130 may thus be a hollow-bore cylinder to allow for the passing of fluid therethrough. In this regard, moving the piston 134 also changes the position of the interior opening 112 relative to the position of the piston housing 132. In this regard, by moving the piston in the direction of arrow 150, this may enable an operator to force the connector portion into the base portion when connecting the connector portion with the base portion (as shown in FIG. 7 discussed further below).

Figure 2:
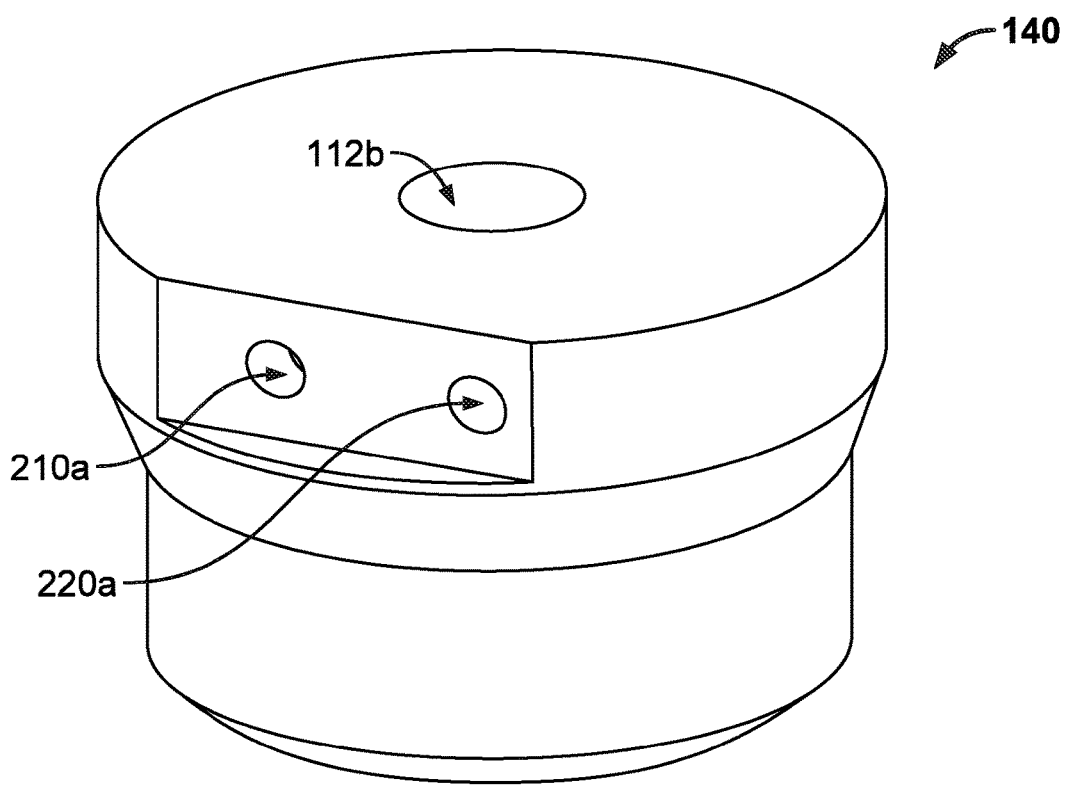
FIG. 2 provides a perspective view of a connector base portion in accordance with aspects of the disclosure.
Figure 3:
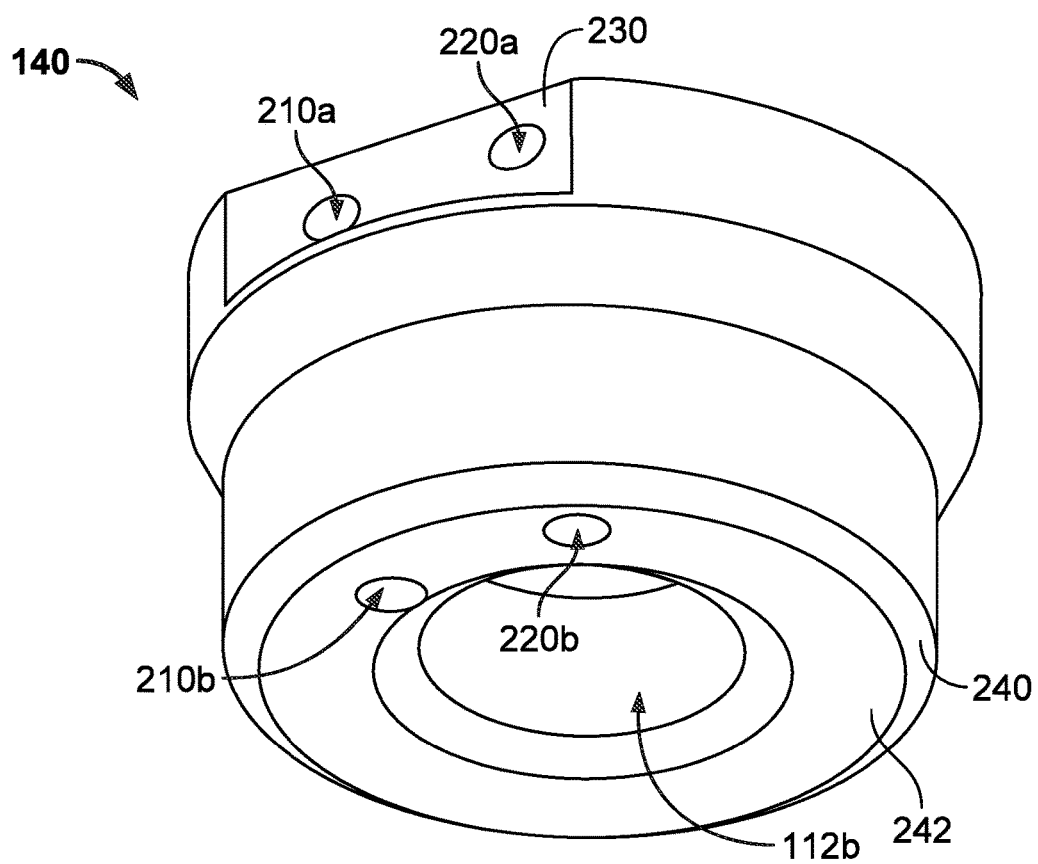
FIG. 3 provides a perspective view of a connector base portion in accordance with aspects of the disclosure.
Figure 4:
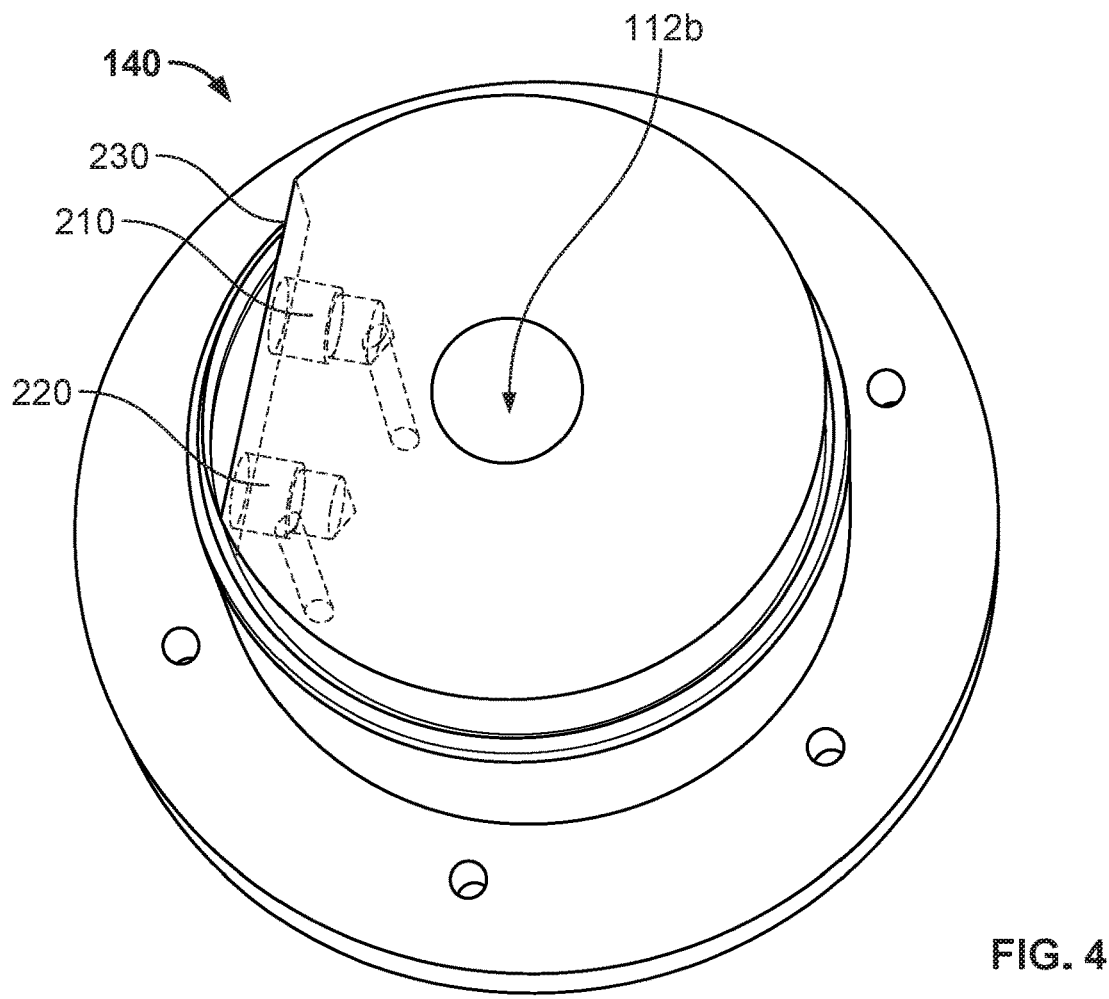
FIG. 4 is a top-down view of a connector base portion in accordance with aspects of the disclosure.
Figure 5:
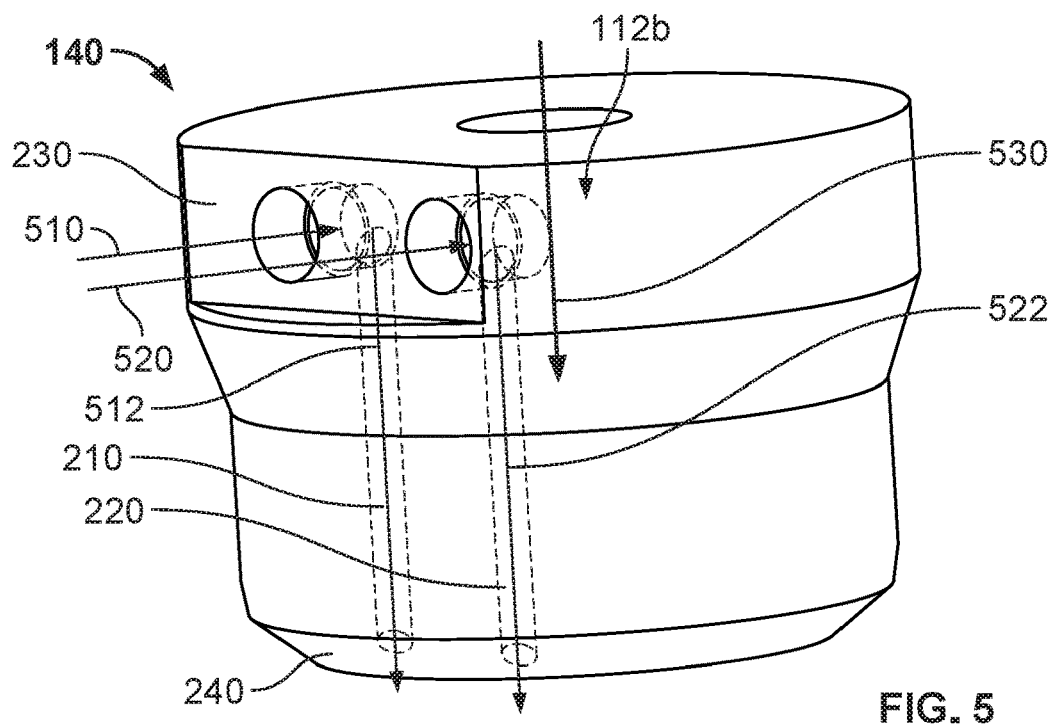
FIG. 5 is a partially transparent view of a connector base portion in accordance with aspects of the disclosure.

FIGS. 2 and 3 provide perspective views of the connector base portion 140, FIG. 4 is a top-down view of the connector base portion 140, and FIG. 5 is a partially transparent view of the connector base portion. The connector base portion 140 may include a pair of chambers 210, 220 separate from the interior opening 112. The chambers 210, 220 (FIGS. 5 and 6) may each include respective chamber openings 210a, 210b, 220a, 220b (FIG. 3) in a side surface 230 and in an outer chamfer 240 of the connector. The chamber openings 210a, 220a may allow fluid to enter into the chambers 210, 220 and pass from the chambers, for instance following the directions of arrows 510, 512, 520, 522, through the chamber openings 210b, 220b and out of the connector base portion. In this regard, these chambers may allow fluid to enter into the connector base portion 140 and flow into the base 120. For example, the chambers 210, 220 may be sized to allow a fluid such a nitrogen to flow through the connector base portion. In this regard, these chambers 210, 220 may be narrower than the interior opening 112. At the same time a third fluid may flow through the interior opening 112b, for instance in the direction of arrow 530, without mixing with the fluid in the chambers 210, 220.

Figure 6:
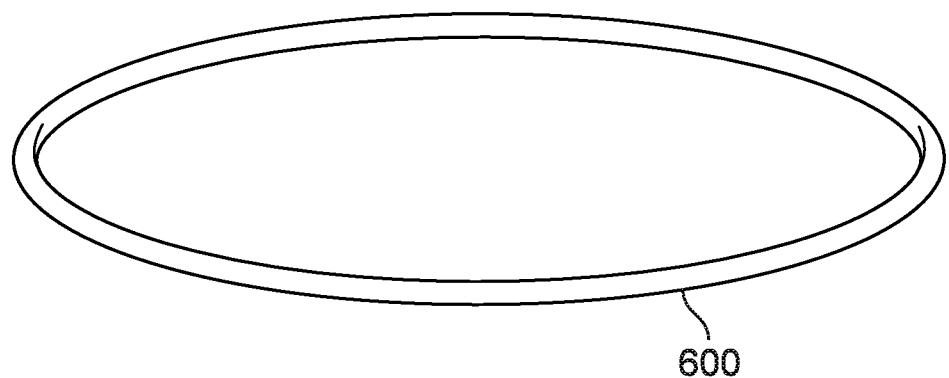
FIG. 6 is a perspective view of an O-ring in accordance with aspects of the disclosure.
Figure 7:
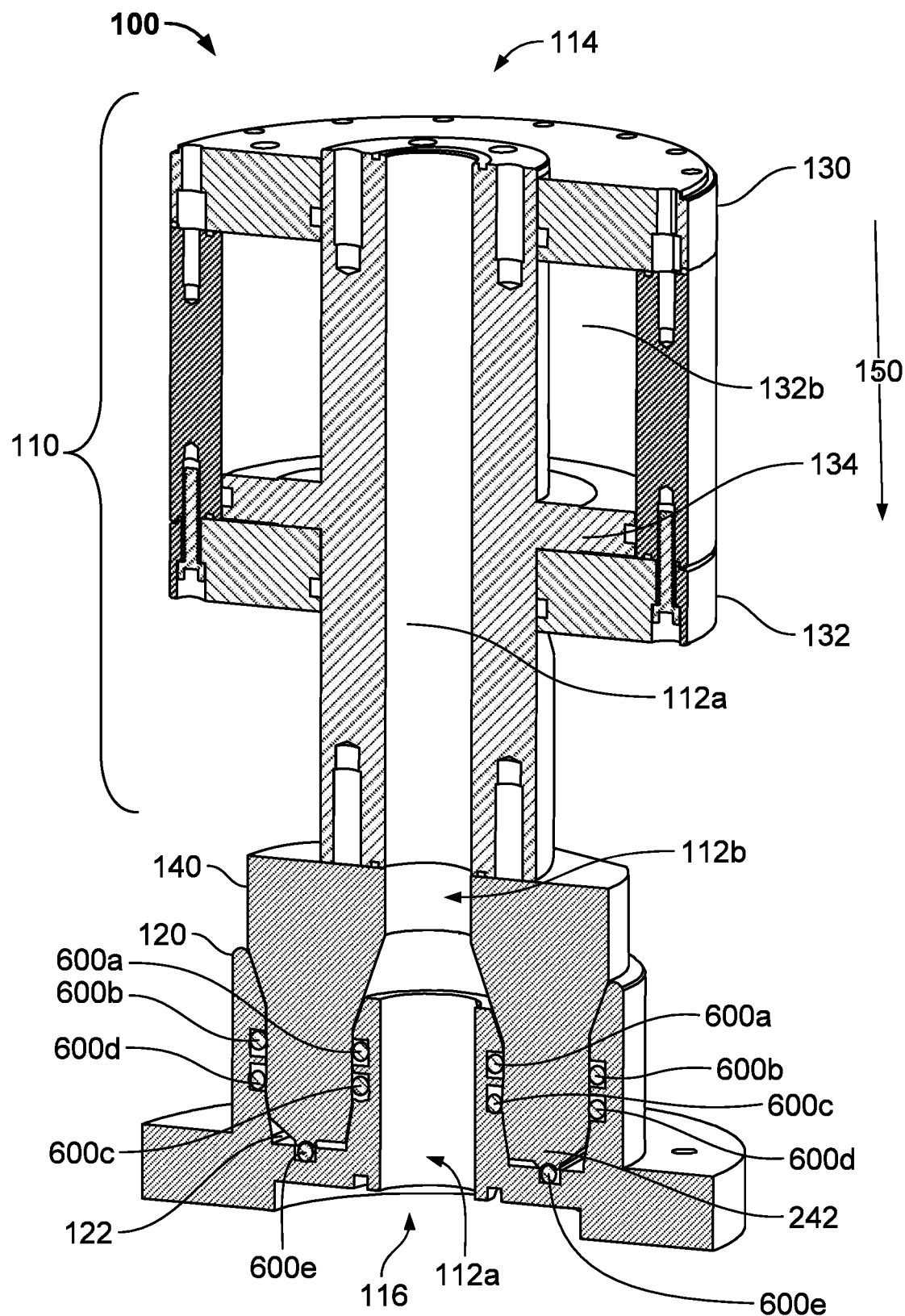
FIG. 7 is a cross-sectional view of a multi-port fluid connector mechanism for fluid routing in accordance with aspects of the disclosure.

FIG. 7 is a cross-sectional view of the mechanism 100 with connector base portion 140 inserted into the base 120. The base 120 may include a plurality of sealing O-rings. FIG. 6 is a perspective view of an O-ring 600 which may correspond to any of O-rings 600a, 600b, 600c, 600d, and 600e shown, for example, in FIGS. 1 and 7. The plurality of O-rings may include corresponding pairs of O-rings 600a, 600b and 600c, 600d each arranged in respective grooves 610a, 610b, 610c, 610d (FIG. 1) in opposing interior side surfaces 620, 622 (FIG. 1) of the base as well as a fifth O-ring 600e arranged in a groove 610e in a bottom interior side surface 122 of the base 120. These O-rings may be made from materials appropriate for forming fluid-tight seals such as fluorosilicone or other materials. Because the O-rings are internally housed, they may be protected from the external environment of the mechanism and less likely to move out of place or degrade.

As shown in FIG. 1, the base 120 may also include an inward-oriented chamfer 630 and an outward-oriented chamfer 640, each configured to engage with a corresponding outer and inner chamfers 632, 642, respectively, of the connector base portion 140. An interior portion 650 of the base 120 may also include a generally complementary shape with respect to an exterior portion 652 of the connector base portion 140. This may enable the O-rings to create the fluid-tight seals when the connector is engaged with the base.

Figure 8:
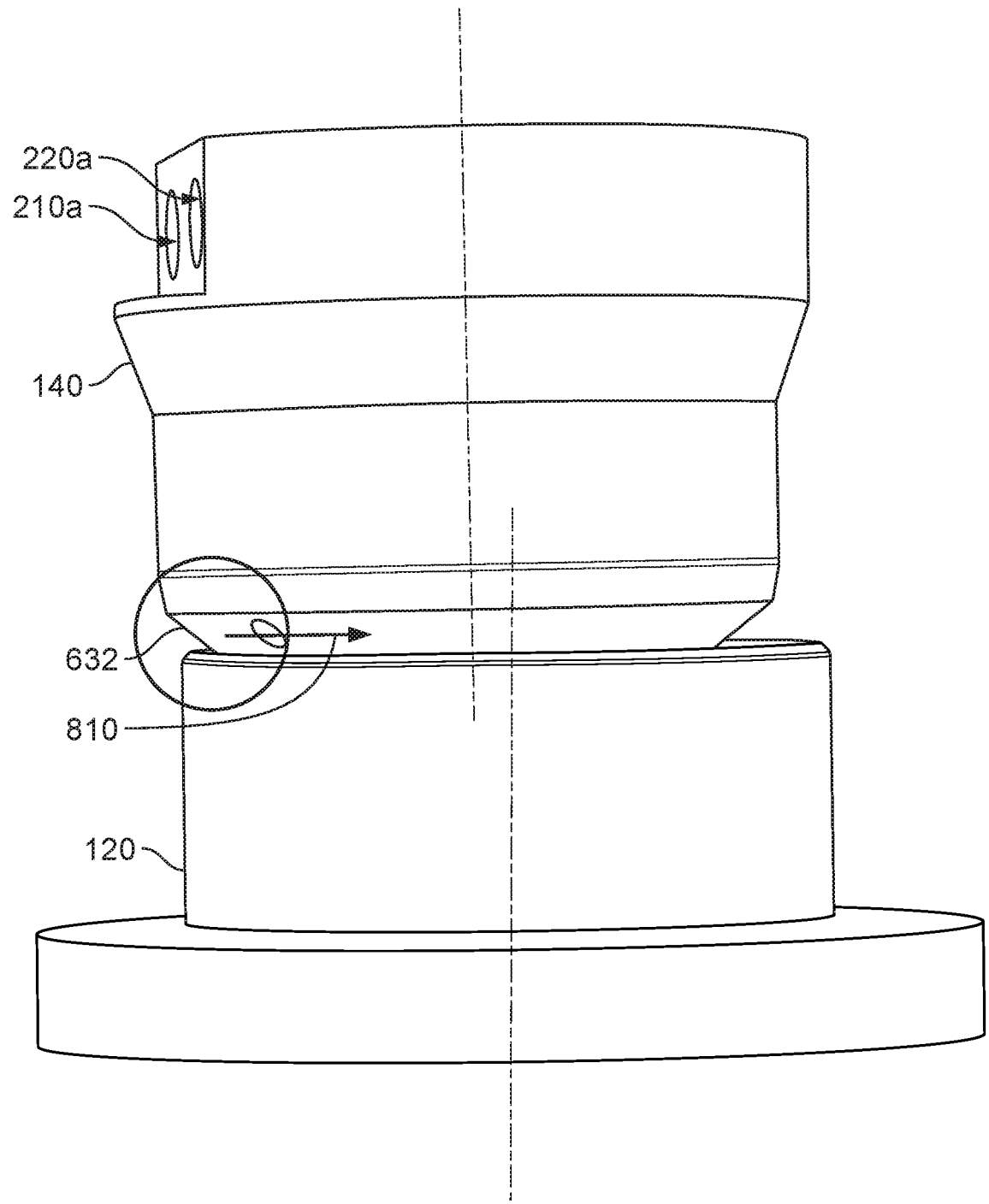
FIG. 8 is a perspective view of a connector base portion being inserted into and engaged with a partially transparent view of a base in accordance with aspects of the disclosure.
Figure 13:
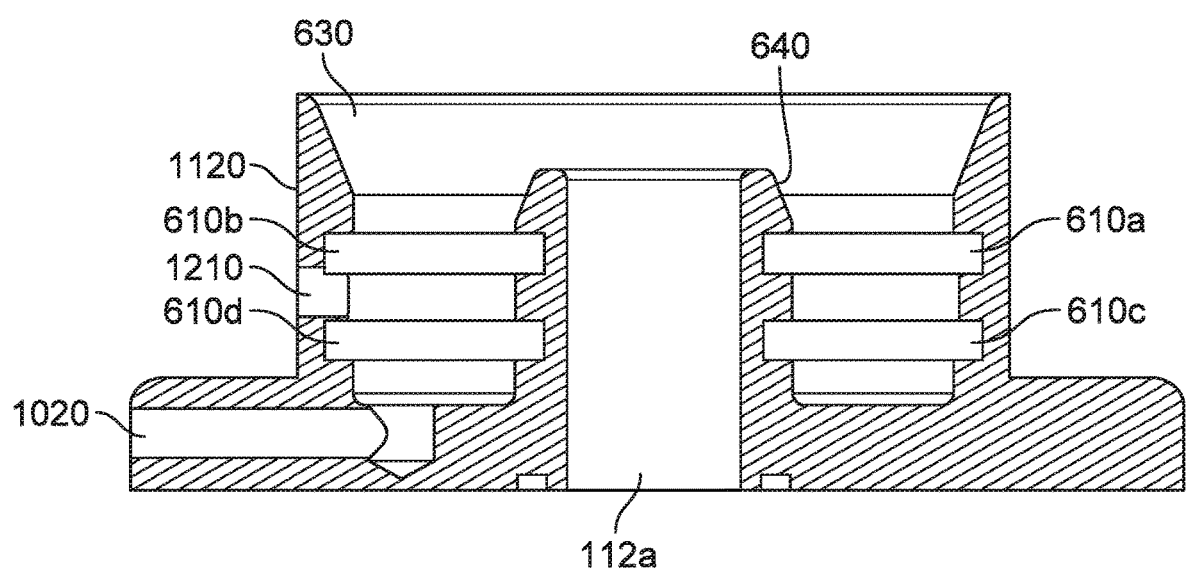
FIG. 13 is a cross-sectional view of a base in accordance with aspects of the disclosure.

FIG. 8 is a perspective view of the connector base portion 140 being inserted into a partially transparent view of the base 120. As noted above, the connector base portion 140 includes an outer chamfer 632 around an exterior of the connector base portion and an inner chamfer 642 (as shown in FIG. 1). The four chamfers 630, 632, 640, 642 may enable the connector base portion 140 to blind mate with the base 120. When engaging with the base 120, the outer chamfers enable the connector to align itself with respect to the base. For example, the outer chamfer 632 of the connector base portion 140 is able to slide against the inward-oriented chamfer 630 (as shown in FIGS. 1 and 13) of the base, forcing the connector base portion to move in the direction of arrow 810 in order to self-align or center the connector base portion 140 with respect to the base 120. The axis lines in FIG. 8 illustrate that the base 120 and connector base portion 140 are not perfectly aligned. The outer chamfer 632 of the connector base portion may also enable the connector to reduce or even eliminate loading on sealing surfaces of the base 120 while maintaining seals during operation. Similarly, when engaging with the base 120, the inner chamfer 642 of the connector base portion 140 and outward-oriented chamfer 640 as shown in FIGS. 1 and 13) of the base 120 may also allow for self-aligning or centering of the connector base portion 140 with respect to the base 120. In addition, the inner chamfer 642 may also allow for load distribution during operation to ensure that the O-rings 600a, 600b, 600c, 600d, 600e as shown in FIG. 7) maintain contact with the respective grooves and the connector base portion and prevent fluid from leaking between the chambers 210, 220 when under heavy side loading.

Figure 9:
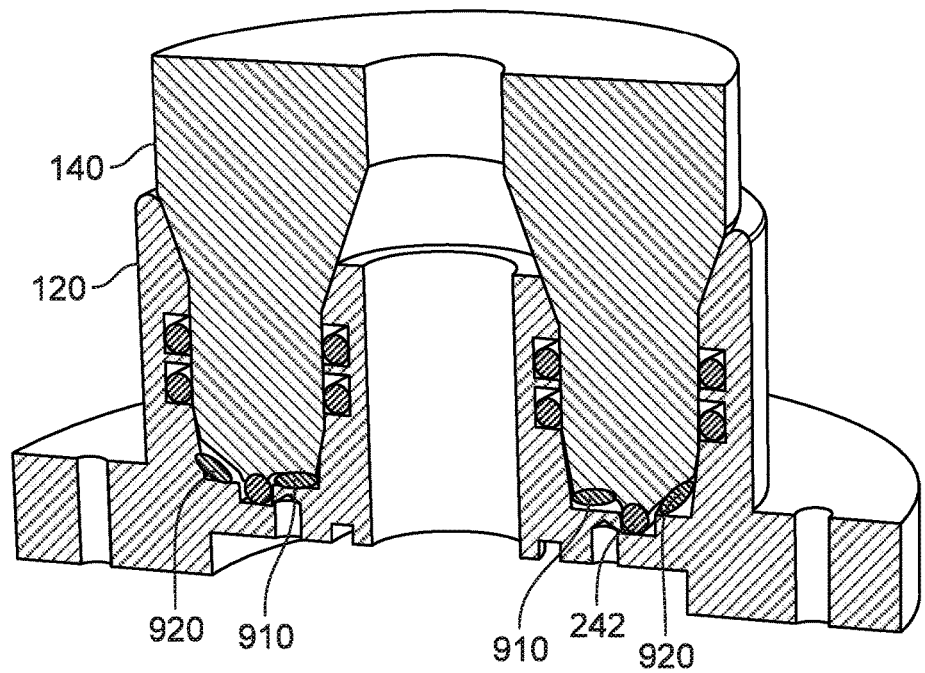
FIG. 9 is a cross-sectional view of a base portion inserted into a base in accordance with aspects of the disclosure.

FIG. 9 is another cross-sectional view of the connector base portion 140 inserted into and engaged with into the base 120. Once, the connector base portion 140 is engaged with the base 120 (as shown in FIGS. 7 and 9), the O-ring 600e arranged in the groove 610e of the base interior surface may create a pair of chambers 910, 920 between the connector base portion 140 and the base 120. These chambers may be separate from one another. For instance, a lower portion 242 of the connector base portion may create a fluid-tight seal between the connector base portion and the O-ring 600e. The O-ring 600e may divide the space between the lower portion 242 and the bottom interior side surface 122 into the chambers 910 and 920 as shown in FIG. 9. Each one of these chambers 910, 920 may be connected to a respective one of the chambers as well as a respective one of the chambers of the connector base portion. In this regard, the chamber openings in the outer chamfer may align with respective chambers allowing fluid to flow from each one of the chamber openings into a respective one of the chambers. Again, this configuration may enable two completely separate (i.e. no mixing) fluid channels through the mechanism.

Figure 10:
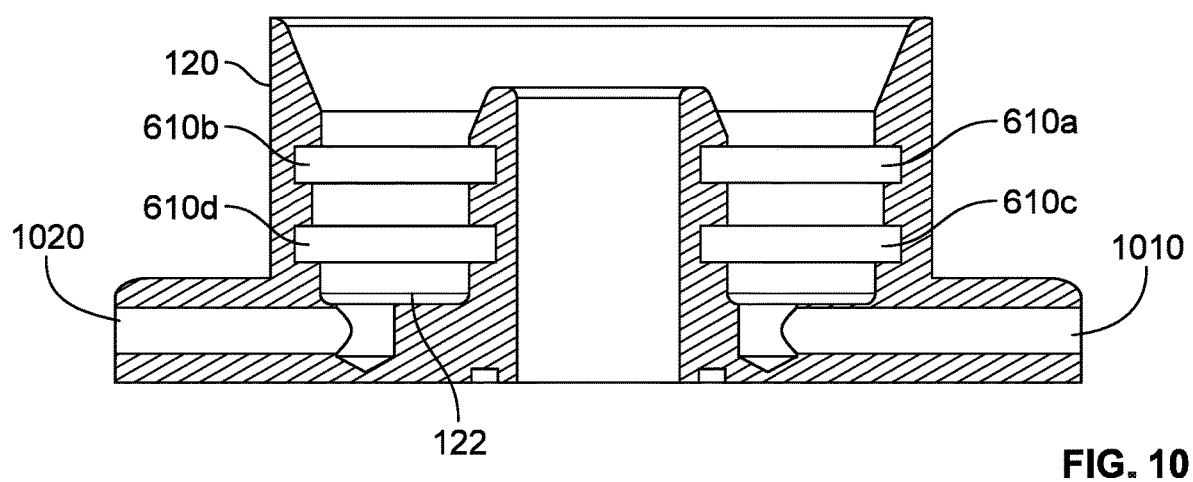
FIG. 10 is a cross-sectional view of a base in accordance with aspects of the disclosure.

FIG. 10 is a cross-sectional view of the base 120. The base may also include fluid ports 1010, 1020 to allow fluid from the chambers 910, 920 to exit the base 120. In this regard, each of the fluid ports 1010, 1020 may be in fluid communication with one of chambers 910, 920. For instance, fluid from chamber 910 may exit the base via fluid port 1010, and fluid from chamber 920 may exit the base via fluid port 1020. The fluid ports 1010, 1020 may be connected to different valves to allow for independent downstream component actuation and may allow for compact coupling of multiple independent pneumatic devices to the mechanism 100.

Figure 11:
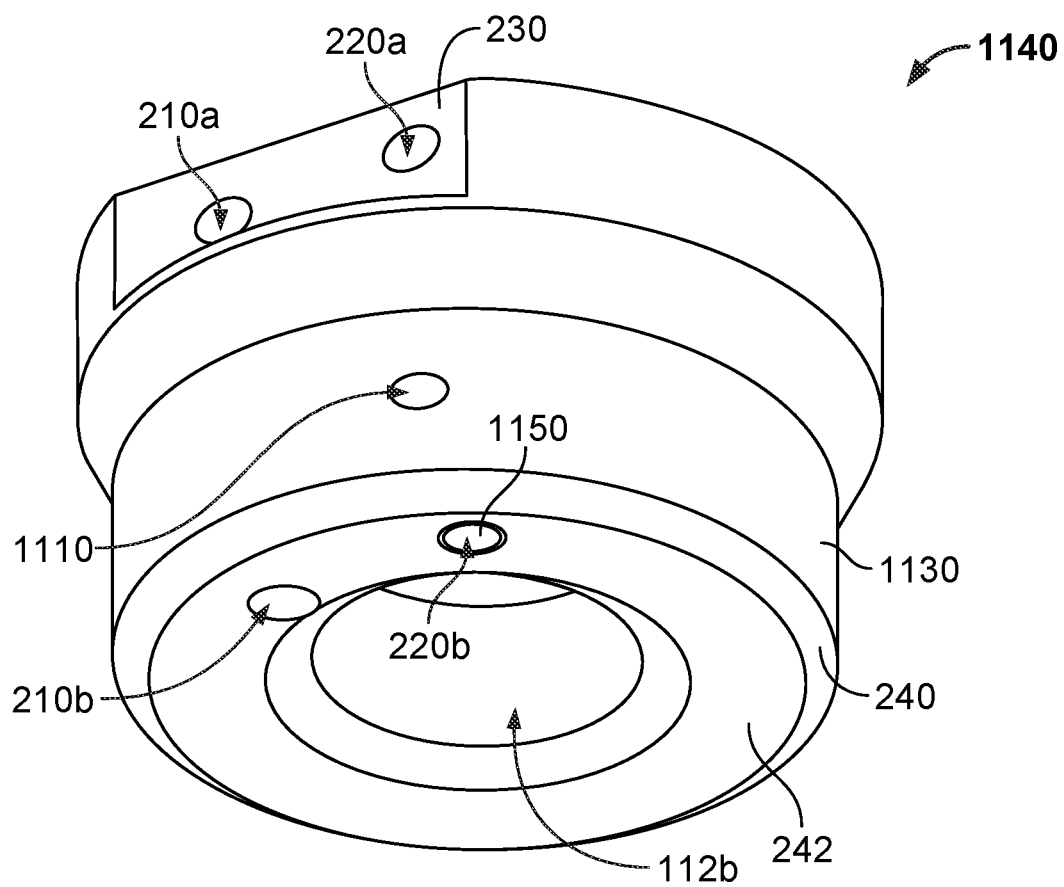
FIG. 11 provides a perspective view of a connector base portion with a chamber opening shown as blocked by a plug in accordance with aspects of the disclosure.

Alternatively, rather than using an O-ring 600e to create a pair of chambers 910, 920 and rather than both of the chamber openings 210b, 220b allowing fluid to flow out of the connector at the chamfer, one of the chamber openings may be removed or blocked (for instance, with a plug or other device). In this way, during manufacture, the chamber openings may be created in the connector base portion by drilling completely through the connector base portion. FIG. 11 provides a perspective view of a connector base portion 1140 which may include the various features discussed above with regard to the connector base portion 140. In this example, the connector base portion 1140 need not include O-ring 600e or groove 610e, and the chamber opening 220b may be blocked by a plug 1150 to prevent fluid from passing through the chamber opening 220b. The plug may be threaded and formed or made of various materials, including for example, brass, stainless steel, aluminum, or other devices used for high-pressure pipe fittings, etc. Alternatively, rather than using a plug, the connector base portion 1140 need not include the chamber opening 220b. In either instance, an additional chamber opening 1110 may be arranged in an outer side surface 1130 of the connector base portion 1140.

Figure 12:
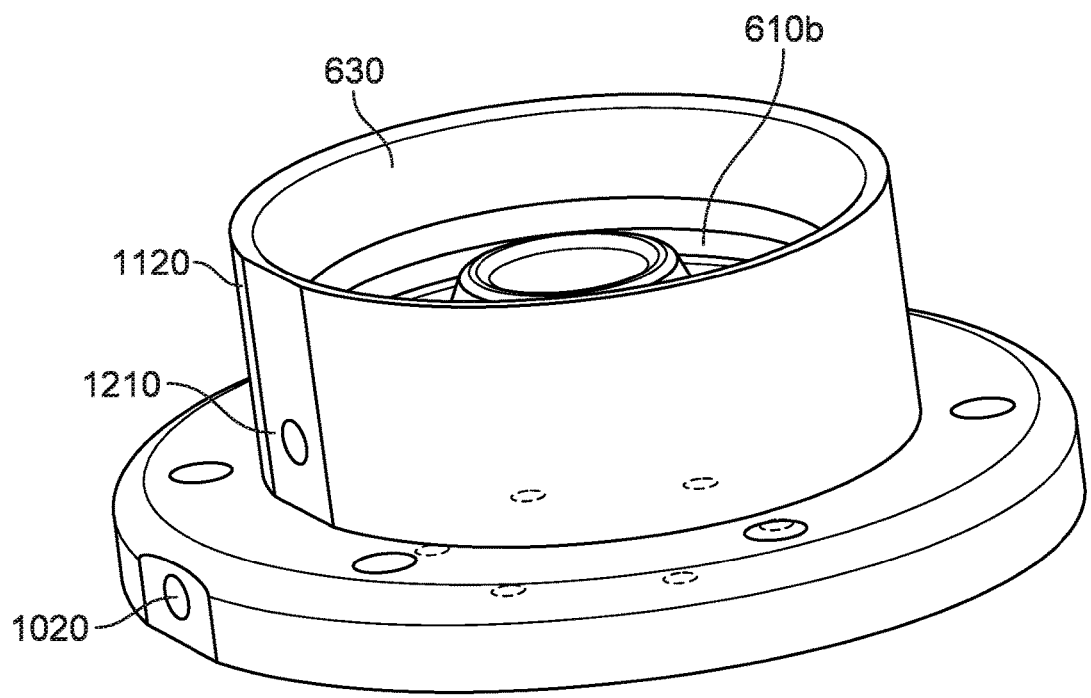
FIG. 12 is a perspective view of a base in accordance with aspects of the disclosure.

FIG. 12 provides a perspective view of a base 1120 which may include the various features discussed above with regard to the base 120. FIG. 13 is a cross-sectional view of the base 1120. In this example, rather than including fluid port 1010, the base 1120 includes a fluid port 1210 which, when the base 1120 and connector base portion 1140 are engaged with one another, is in fluid communication with the additional chamber opening 1110.

Figure 14:
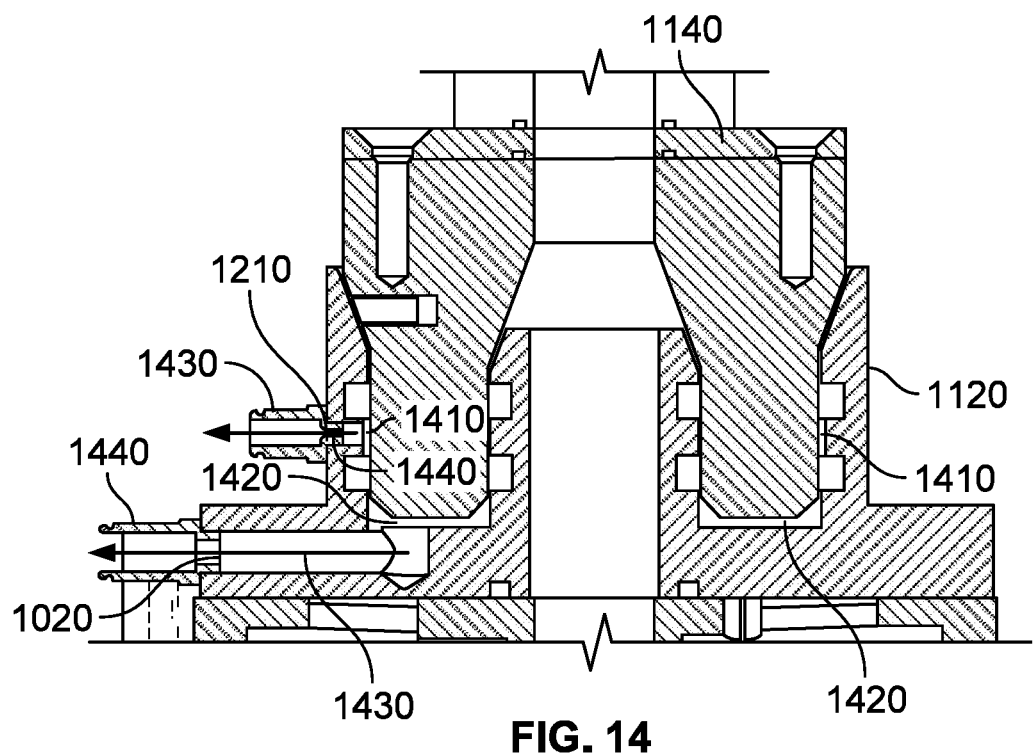
FIG. 14 is a cross sectional view of a connector base portion inserted into and engaged with a base in accordance with aspects of the disclosure.

FIG. 14 is a cross sectional view of the connector base portion 1140 inserted into and engaged with the base 1120. When the connector base portion 1140 is engaged with the base 1120, the additional chamber opening 1110 may be positioned between a pair of O-rings, here O-rings 600b, 600d (not shown in FIG. 14 for clarity) arranged in the grooves 610b, 610c of the base 120. In this regard, the O-rings 600b, 600c may form a fluid-tight chamber 1420 between the connector base portion 1140 and the base 1120. The fluid port 1020 may enable fluid within the chamber 1420 to exit the base 1120. In this regard, fluid within the chamber 1420 may flow out of the base via the fluid port 1020, for instance in the direction of arrow 1430. In addition, a second fluid-tight chamber 1410 may be formed by the O-rings 610c, 610d and a lower portion 242 of the connector base portion 1140 and the bottom interior side surface 122 of the base 1120. In this regard, fluid within the chamber 1410 may flow out of the base via the fluid port 1210, for instance in the direction of arrow 1440. As such, each of the fluid ports 1210, 1220 may be in fluid communication with one of chambers 1410, 1420, each of which is separate from the other.

As with fluid ports 1010, 1020, the fluid ports 1210, 1020 as shown in FIG. 14 may be connected to different valves 1430, 1440 to allow for independent downstream component actuation (such as the grabbing mechanism 1530 discussed further below) and may allow for compact coupling of multiple independent pneumatic devices to the mechanism 100.

The mechanism 100 described herein may be utilized in any number of gas dispensing, metering or storage equipment. This could be adapted for as many gasses as needed, or as high of flows as needed, for use in aerospace, oil and gas, semiconductor manufacturing, pharmaceutical manufacturing, or any other industry in which multiple high flow gasses need to be connected from one point to another.

Figure 15:
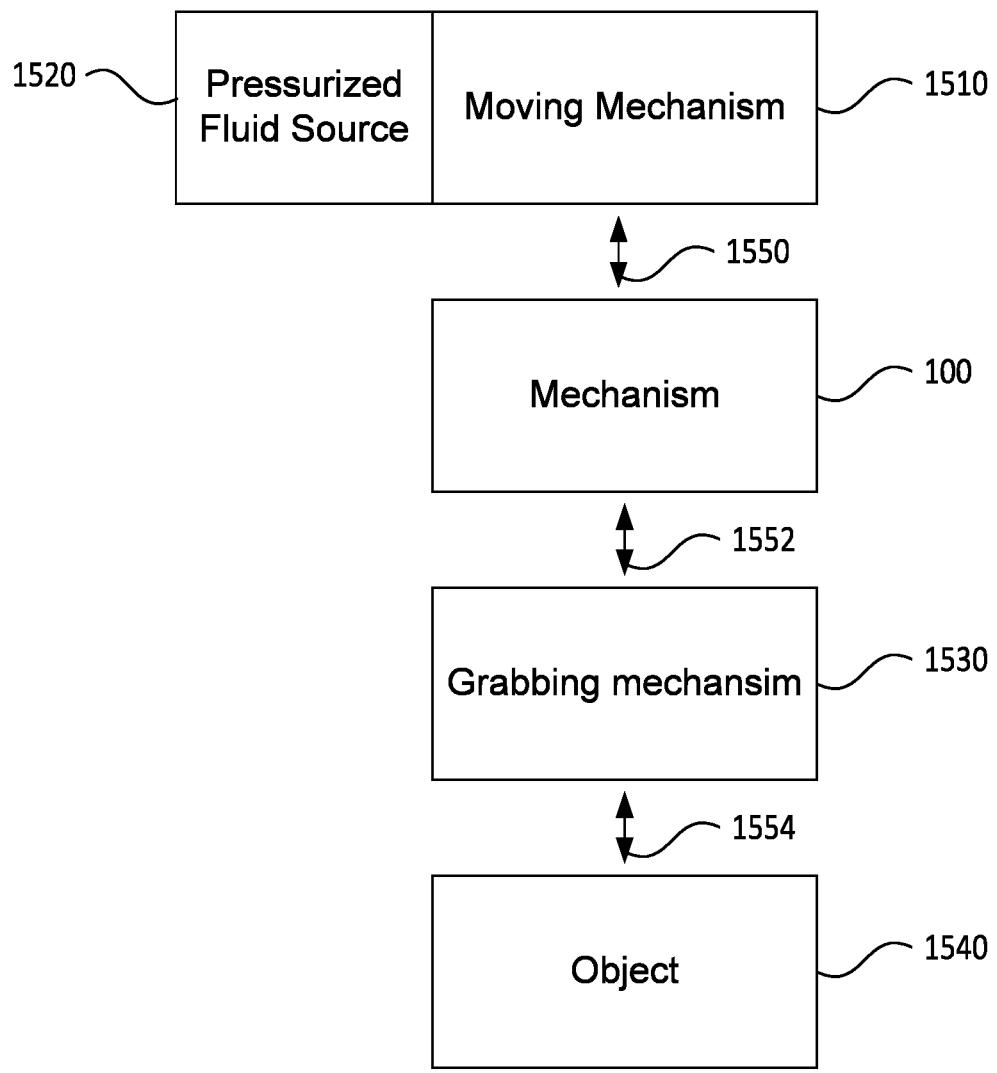
FIG. 15 includes an example system including a moving mechanism connected to a grabbing mechanism which together can be used to lift (vertically), pull (horizontally), or otherwise move a load or object in accordance with aspects of the disclosure.

FIG. 15 includes an example system 1500 including a moving mechanism 1510, connected to a grabbing mechanism 1530 which together can be used to lift (vertically), pull (horizontally), or otherwise move a load or object 1540. The mechanism 100 may be arranged between the moving mechanism 1510 and the grabbing mechanism 1530 to enable fluid to flow from a pressurized fluid source (or sources) 1520 through the mechanism 100 to the grabbing mechanism 1530. The arrows 1550, 1552, 1554 each represent mechanical connections between the moving mechanism 1510 and the mechanism 100, between the mechanism 100 and the grabbing mechanism 1530, and between the grabbing mechanism 1530 and the object 1540, respectively, as discussed in further detail below. This example should not be considered as limiting the scope of the disclosure or usefulness of the features described herein.

The moving mechanism 1510 may include a tool (such as a handheld or larger device), a machine for towing (such as a car, truck, or train), or other device that can be used to move and release objects such as robotic arms, assembly machine parts, construction equipment, sorting machines, pick and place robots, various types of cranes, including gantry cranes and jib cranes, etc. The moving mechanism 1510 may be attached to or include a pressurized fluid source (or sources) 1520 such as an air source, compressor, or other device which can provide one or more pressurized fluids (air or gas) to the mechanism 100.

Figure 16:
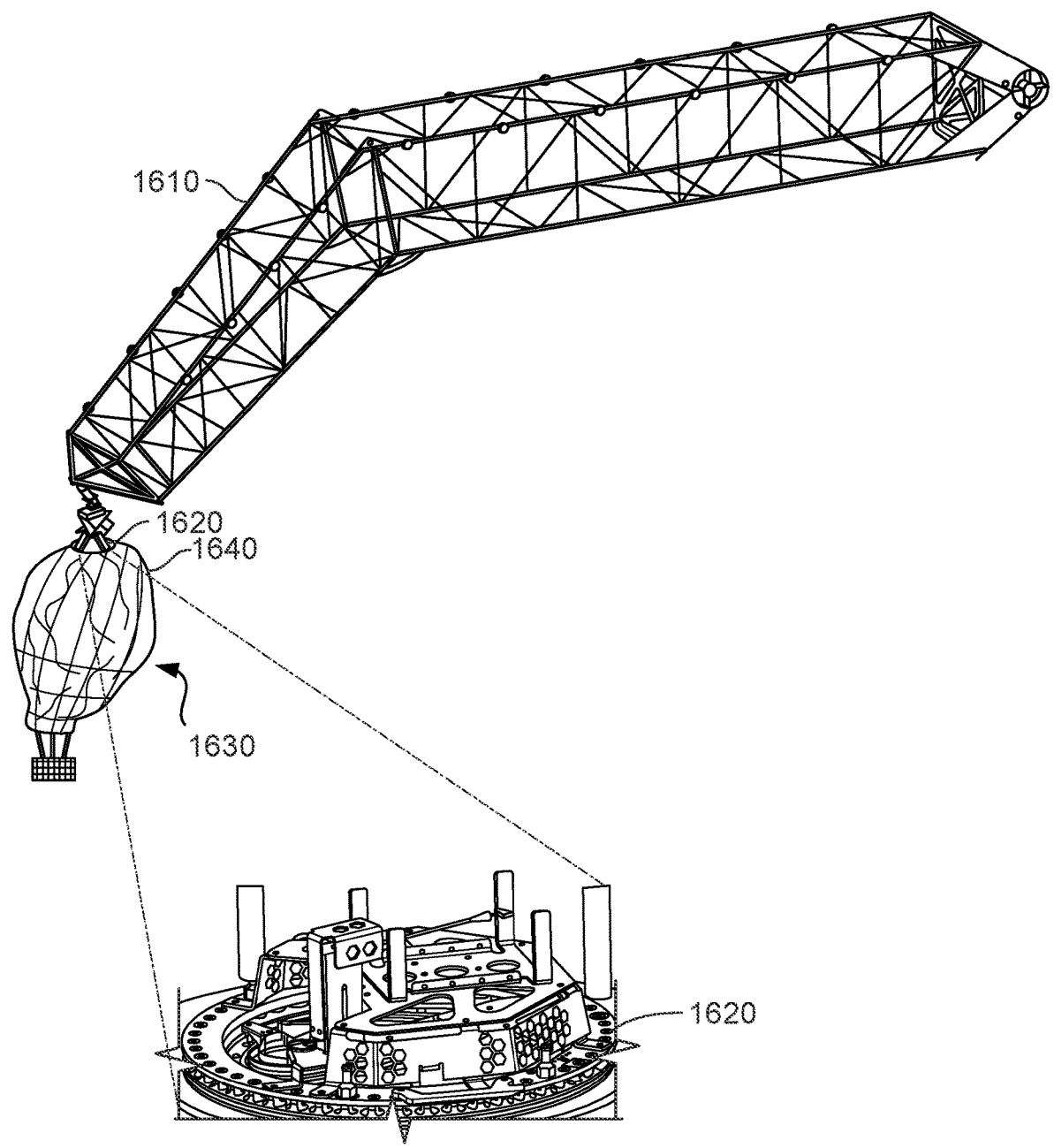
FIG. 16 is an example of a portion of a crane attached to a top plate of a balloon as well as a detail view of the top plate in accordance with aspects of the disclosure.

FIG. 16 is an example of a portion of a crane 1610 attached to a top plate 1620 of a balloon 1630 which may correspond to the object 1540 as well as a detail view of the top plate 1620. For instance, when launching a balloon 1630 using a crane and filling a balloon envelope 1640 from the top down, the mechanism 100 may be especially useful. For example, a fill port of the balloon 1630 as well as various grab and release mechanisms may need to be connected to individual separate gas sources quickly and automatically while accounting for high side loads imparted by the balloon during filling operations. The mechanism 100 may enable two separate lines (for instance via the chambers 910, 920 or the chambers 1410 and 1420) for pressurized fluids to allow independent movement of different components of the grabbing mechanism 1530 and a third separate line (for instance via the interior opening 112) which maintains the ability to push high purity high flow helium.

Figure 17:
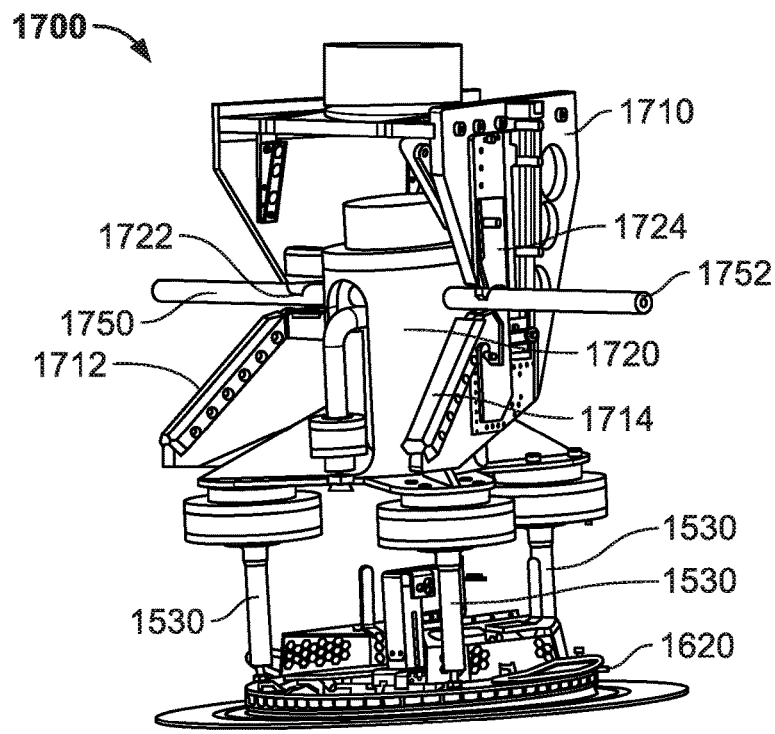
FIG. 17 is an example perspective view of a pick and release mechanism, a multi-port fluid connector mechanism, and a top plate in accordance with aspects of the disclosure.
Figure 18:
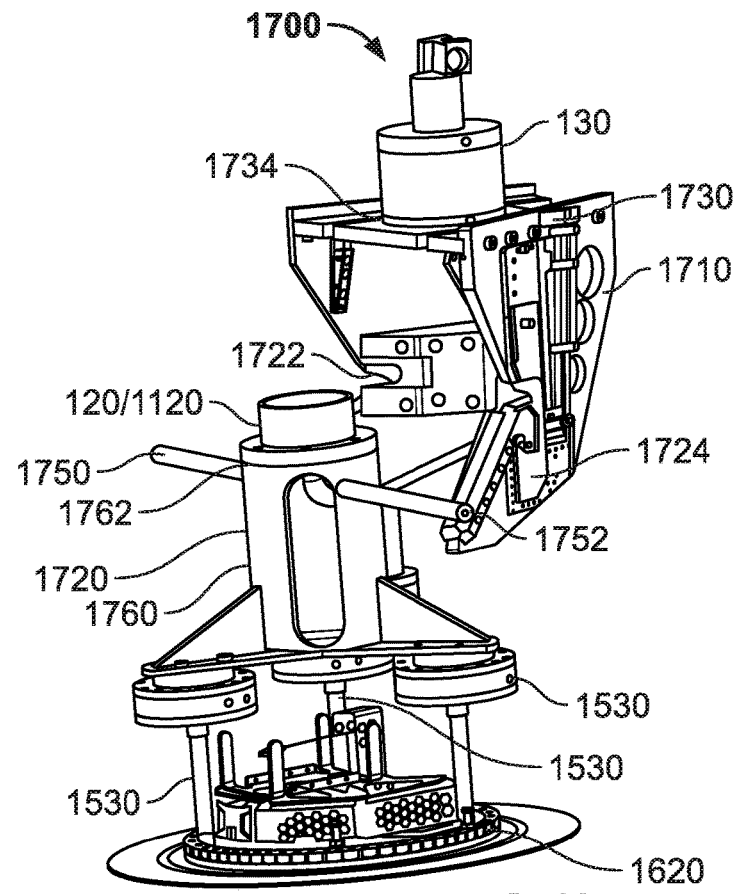
FIG. 18 is another example perspective view of a pick and release mechanism, a multi-port fluid connector mechanism, and a top plate in accordance with aspects of the disclosure.
Figure 19:
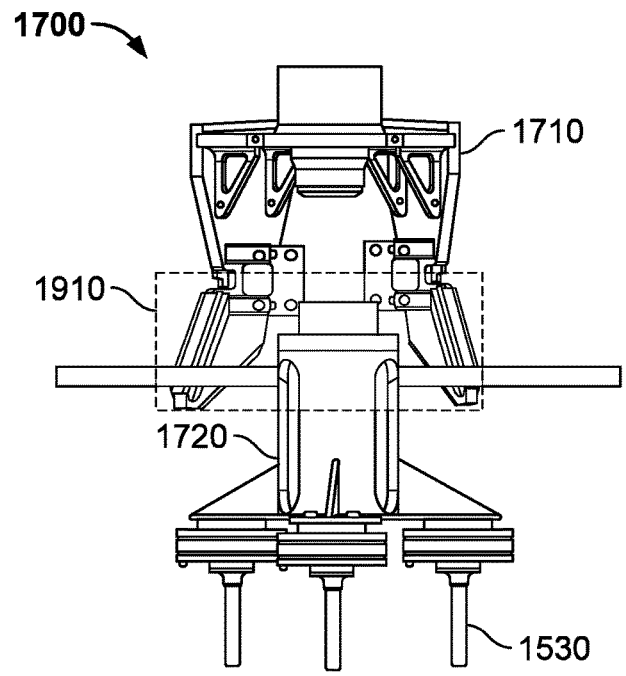
FIG. 19 is another example perspective view of a pick and release mechanism, a multi-port fluid connector mechanism, and a top plate in accordance with aspects of the disclosure.
Figure 20:
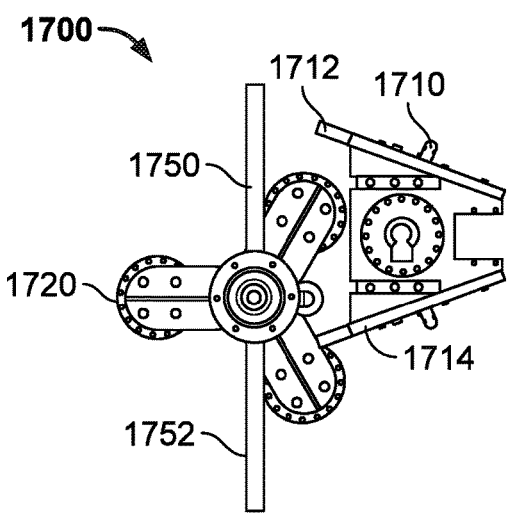
FIG. 20 is a top-down view of a pick and release mechanism and a multi-port fluid connector mechanism in accordance with aspects of the disclosure.
Figure 21:
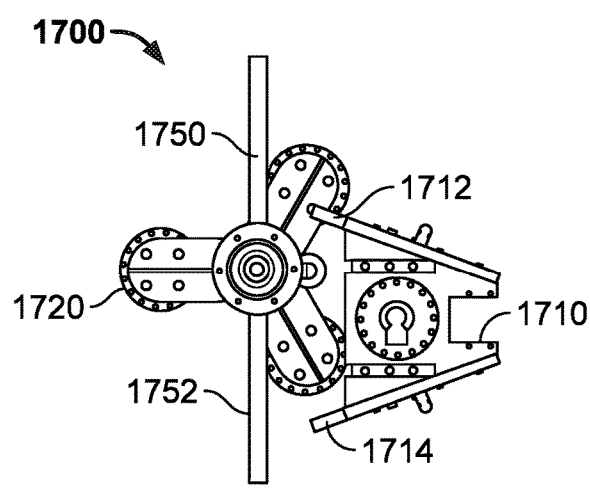
FIG. 21 is another top-down view of a pick and release mechanism and a multi-port fluid connector mechanism in accordance with aspects of the disclosure.

The mechanism 100 may also be used with other devices. For instance, FIGS. 17, 18, and 19 are example perspective views of a pick and release mechanism 1700 with mechanism 100 and the top plate 1620. FIGS. 20 and 21 are top down views of the mechanism 1700 and mechanism 100. In this regard, the mechanism 100 may be incorporated into the mechanism 1700 which is connected to a balloon envelope in order to fill the balloon envelope with lift gas and thereafter disconnected in order to allow for launching of the balloon. For instance, this second mechanism may include first and second portions 1710, 1720. In the example of FIG. 17, the first and second portions 1710, 1720 are engaged with one another, and in the example of FIGS. 18, 20 and 21, the first and second portions are not engaged with one another.

The first portion 1710 may connect to a boom of a crane (such as crane 1610 of FIG. 16) and includes a pair of angled surfaces 1712, 1714 each of which terminate at a respective bar lock plate 1722, 1724. The piston portion 130 and connector base portion 140 or 1140 of mechanism 100 may be arranged at one end 1734 of a body 1730 of the first portion 1710. The angled surfaces 1712, 1714 may extend away from the body 1730. The first portion 1710 may also include a mechanical crimper 1740 which can crimp and therefore seal a fill port 2510 (shown in FIG. 25) of the balloon.

The second portion 1720 is connected to the grabbing mechanism 1530 for grabbing the object 1540, such as the top plate 1620. The grabbing mechanism 1530 may function to grab and release pull studs utilizing fluid, such as nitrogen, from the aforementioned chambers of the connector base portion of the mechanism. The grabbing mechanism 1530 may include any type of grabbing mechanism capable of automatically releasing the object pneumatically or hydraulically. For instance, the grabbing mechanism 1530 may include a hook, claw, grabbers, tow or other hitch, etc. that can grab the object and when supplied with pressurized fluid (such as air or gas) will automatically release the object 1540.

The second portion 1720 also includes a pair of arms 1750, 1752 or guide bars which extend laterally from a body 1760 of the second portion. The base 120 or 1120 mechanism 100 may be attached to one end 1764 of the body 1760 via bolts, screws or other fasteners. The body 1760 also includes a structure or fill line 1762 which connects the opening in the base with the fill port 2520. The fill line 1762 also connects with the fill port 2510.

In order to insert the second portion 1720 into the first portion 1710, the first portion may be moved lateral towards the second portion. Eventually the arms 1750, 1752 will contact a respective one of the angled surfaces 1712, 1714. The arms 1750, 1752 may then slide along the angled surfaces. The angle and relative positions of the angled surfaces 1712, 1714 with respect to the first portion 1710 act as a guide for the arms 1750, 1752 and may allow for quite a bit of freedom when attempting to line up the first portion 1710 and the second portion 1720 as shown in FIGS. 19, 20 and 21. For example, the angled surfaces 1712, 1714 may provide a relatively large mate window 1910 (for example, 300 mm×150 mm window or larger or smaller) within which if the arms 1750, 1752 are driven will still precisely mate the first portion 1710 with the second portion 1720. In other words, relative positioning does not have to be exact when inserting the second portion 1720 into the first portion 1710 which may be especially helpful in situations where the 1610 crane with an imprecise boom is used.

Figure 22:
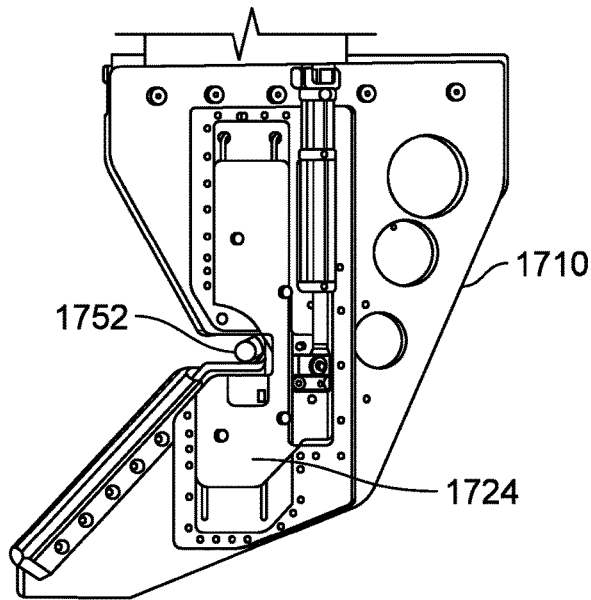
FIG. 22 is a partial side view of the first portion depicting the bar lock plate in the open position in accordance with aspects of the disclosure
Figure 23:
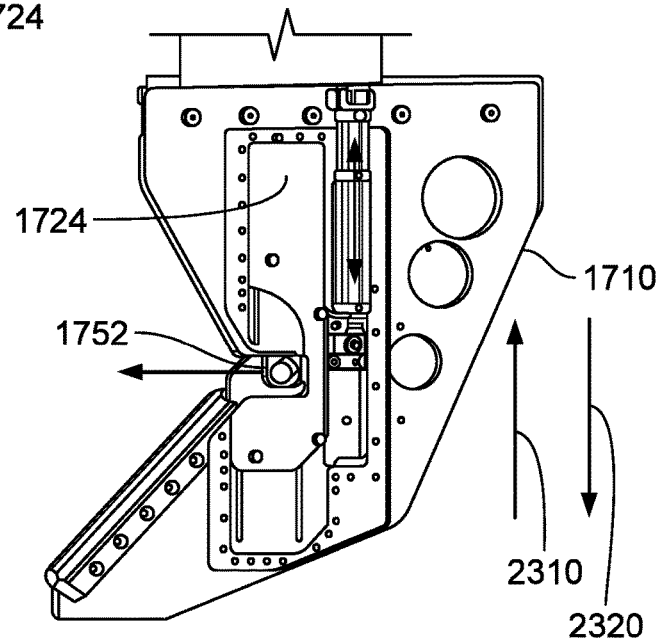
FIG. 23 is a partial side view of the first portion depicting the bar lock plate in the locked position in accordance with aspects of the disclosure.
Figure 24:
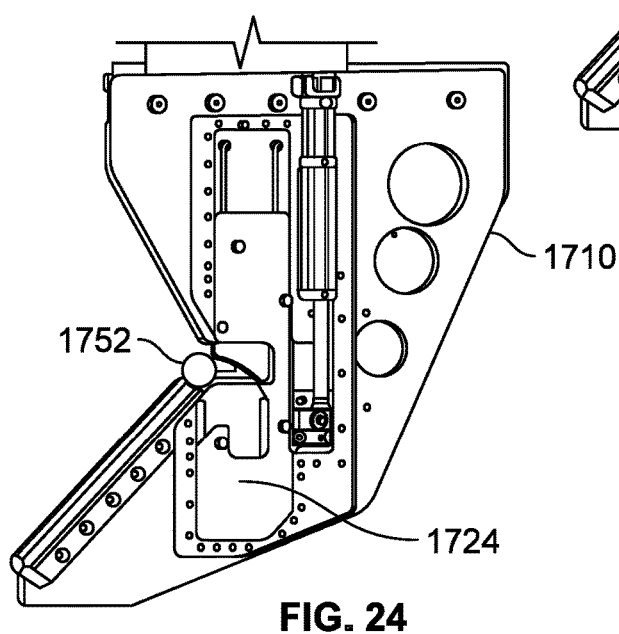
FIG. 24 is a partial side view of the first portion depicting the bar lock plate ejecting an arm in accordance with aspects of the disclosure.

FIGS. 22-24 are partial side views of the first portion 1710 depicting the bar lock plate in the open position, in the locked position, and ejecting arm 1752. Once the arms 1750, 1752 are fully inserted into the first portion 1710 (as shown in FIG. 22) the bar lock plates 1722, 1724 may be moved as indicated by arrow 2310 and locked against the arms (as shown in FIG. 23) in order to prevent the first portion and the second portion from disengaging one another. To eject and release the arms 1750, 1752, the bar lock plates may be moved in the direction of arrow 2320. In addition, the shape of the bar lock plates are configured to smoothly eject the arms 1750, 1752 (as shown in FIG. 24). For example, ejection face on the bar lock plates may have an arc shape, resulting in a nonlinear transition, such that the bar lock plates are able to initiate movement of the arms 1740, 1752 without excessive force. This arc shape may also allow the bar lock plates to carry the arms fully through ejection with a smooth curve and reducing or eliminating any jolts or jarring motions or forces on the arms while at the same time preventing the arms from getting jammed on the bar lock plates.

Figure 25:
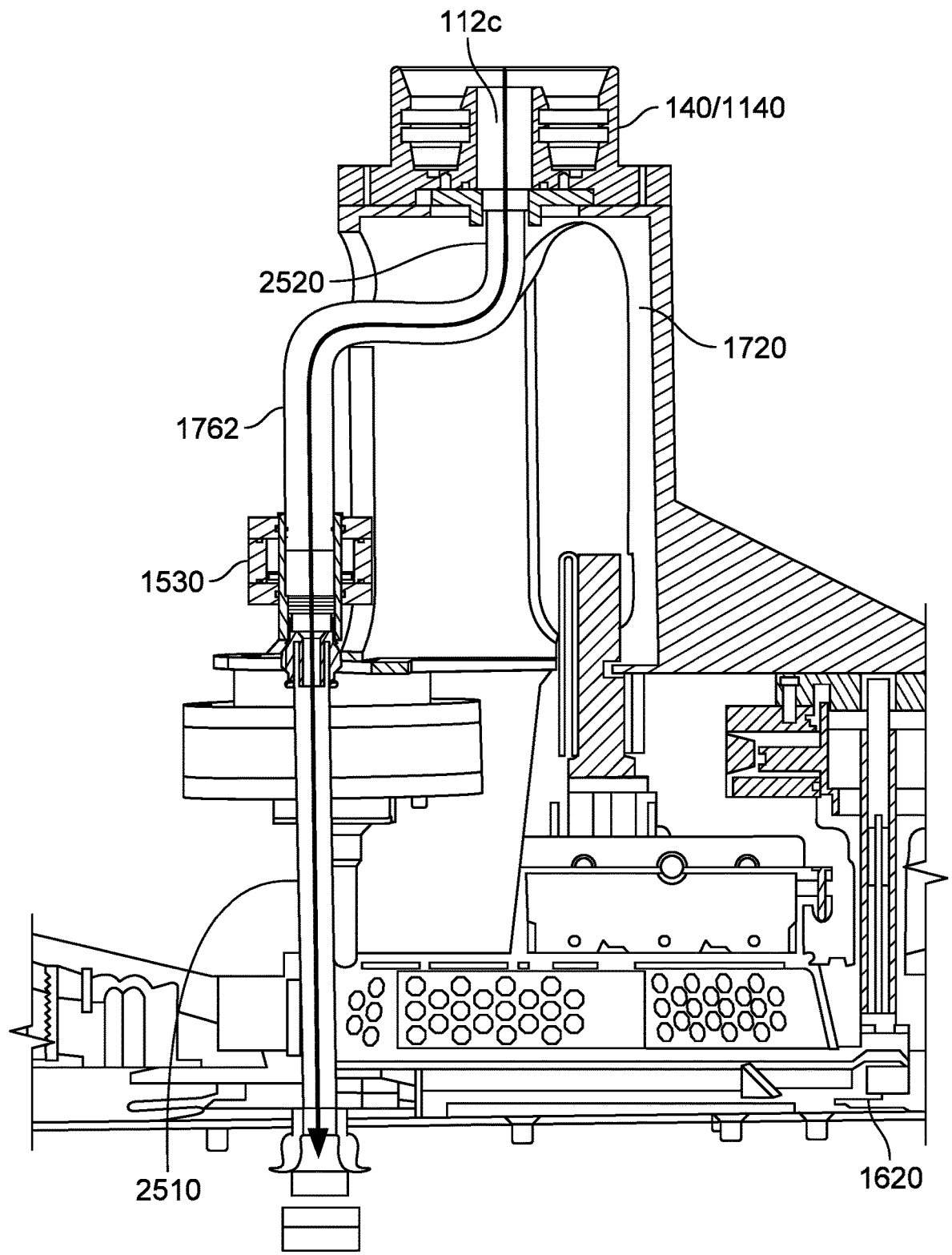
FIG. 25 provides a cross-sectional view of aspects of connector base portion, a first portion, a grabbing mechanism, a fill line, a fill port, and a top plate in accordance with aspects of the disclosure.
Figure 26:
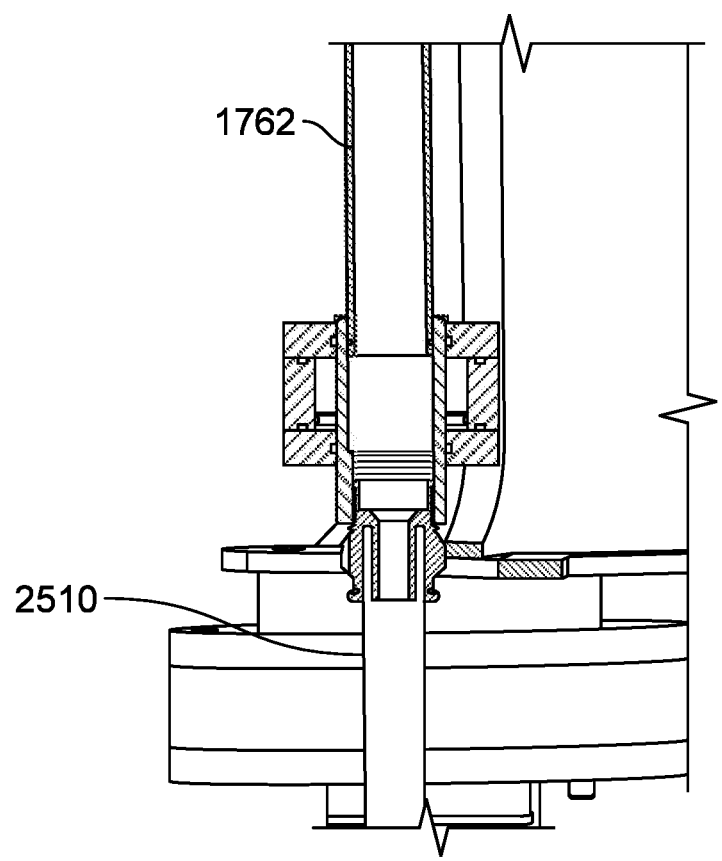
FIG. 26 is a detail view of a portion of FIG. 25 in accordance with aspects of the disclosure.
Figure 27:
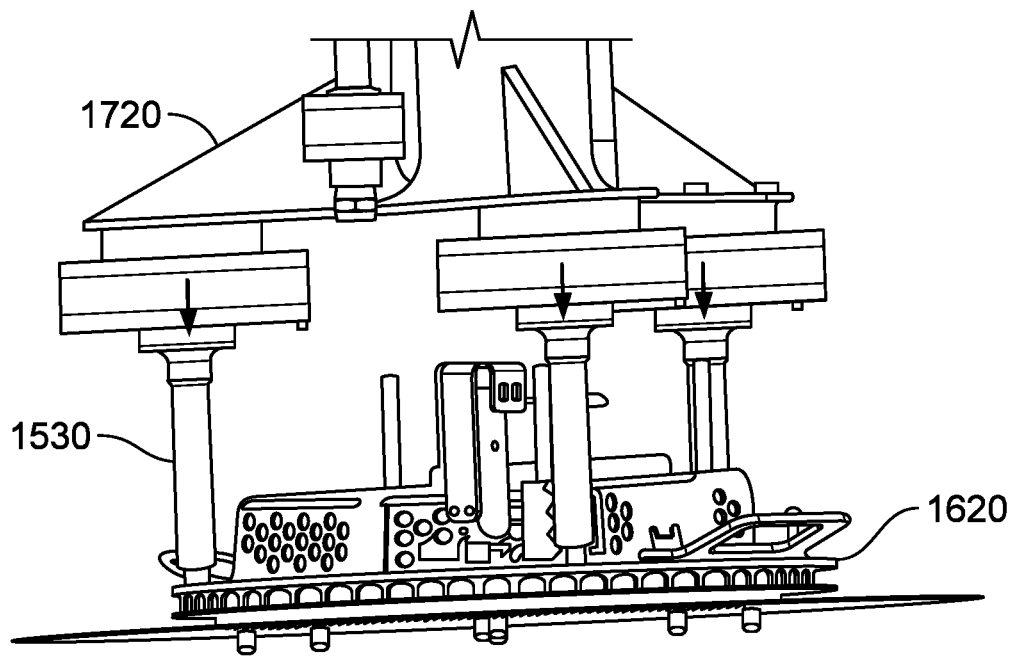
FIG. 27 is an example view of a grabbing mechanism when engaged with a top plate in accordance with aspects of the disclosure.
Figure 28:
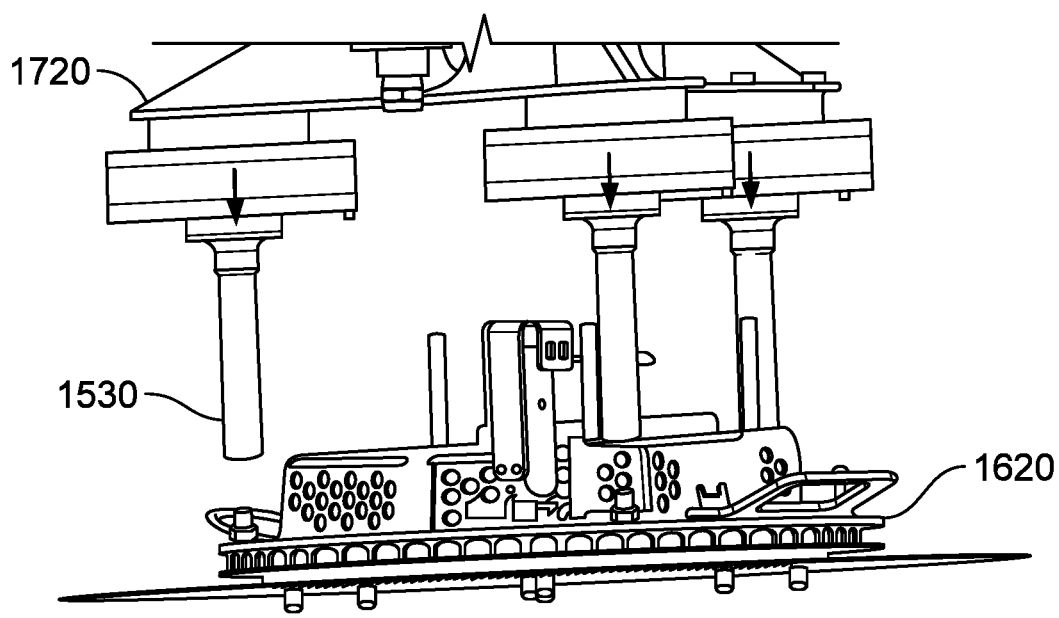
FIG. 28 is an example view a grabbing mechanism when not engaged with a top plate in accordance with aspects of the disclosure.

FIG. 25 provides a partial cross-sectional view of the connector base portion 140/1140, first portion 1710, grabbing mechanism 1530, fill line 1762, fill port 2510, and top plate 1620, and FIG. 26 is a detail view of a portion of FIG. 25. FIG. 27 is an example view of the grabbing mechanism 1530 when engaged with the top plate 1620, and FIG. 28 is an example view the grabbing mechanism 1530 when not engaged with the top plate 1620. Once engaged with the top plate, the connector base portion 140 or 1140 may be positioned just above the base 120, 1120. In order to engage the connector base portion 140 or 1140 with the base 120, 1120, the piston 134 may be activated via the opening 136 as described above. This may force the connector base portion 140 or 1140 into the base 120 or 1120 forming the seals as noted above. At this point, lift gas 2520 may be provided to the balloon envelope by way of the interior opening 112 and the fill line 1762. Once inflated to the desired amount, the fill port 2510 may be crimped using the crimper 1740, and the top plate 1620 may be release by activating the grabbing mechanism 1530 using a fluid, for instance nitrogen, from the pressurized fluid source (or sources) 1520 via chambers 910, 920 or chambers 1410, 1420. In this regard, the chambers 910, 920 and chambers 1410, 1420 may act as conduits. Eventually, the bar lock plates 1722, 1724 may also be unlocked in order to eject (by force) and release the first portion 1710 from the second portion 1720.

The features described herein may provide a wide range of useful benefits. For instance, the configuration of the chamfers, which enables self-centering, may minimize engagement time as well as the potential for mistakes when aligning the connector and the base with one another. Thus, the mechanism provides for precise control in imprecise environments and may be especially useful in non-precision equipment, like large cranes or where a large arm is incapable of repeatedly returning to the exact same position. In addition, because the position of the piston can be controlled via a remote air source and because the connector is self-centering, operation of the mechanism may be performed remotely. The combination of the cylindrical and complementary shapes of the connector and the base as well as the aforementioned chamfers may enable the connector to be constrained in translation, pitch and yaw with respect to the base once the connector and the base are fully engaged. In other words, the seals may remain fluid-tight even when the two sides of the connector are loaded in bending or in shear. This may be especially useful for use in systems which may be subject to high side and vertical loads. In addition, the mechanism enables the use of multiple (and even different types of) fluids, minimizes engagement time as well as the potential for mistakes.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising a fluid connector mechanism having an opening therethrough, the fluid connector mechanism further including:
   a connector having a connector base portion and a piston portion including a piston housing, a piston, and the opening extends from the piston portion, through the piston, and through the connector base portion, the connector base portion including first and second chambers configured to allow fluid to flow from the connector into the base when the connector is engaged with the base; and
   a base having first and second pairs of O-rings arranged in first and second pairs of grooves, the opening further extending from one end of the base to another, and wherein the connector base portion and the base are configured to engage with one another and create fluid-tight seals with the O-rings while the piston is arranged outside of the base.

2. The system of claim 1, wherein the piston housing includes a chamber, and the piston is arranged such that pressurizing the chamber causes the piston to move relative to the piston housing and engage the connector with the base.

3. The system of claim 1, wherein the first and second chambers are completely separate and do not allow for fluid to pass between the first chamber and the second chamber during operation.

4. The system of claim 3, wherein the connector base portion includes a chamfer and the first and second chambers include respective chamber openings arranged in the chamfer.

5. The system of claim 4, wherein the base includes a groove arranged in an interior surface of the base and another O-ring in the groove, and wherein when the connector is engaged with the base, the another O-ring creates a pair of separate chambers, and each of the respective chamber openings is connected to one of the pair of separate chambers.

6. The system of claim 5, wherein the base includes a pair of fluid ports, and wherein each one of the pair of separate chambers is connected to a respective one of the pair of fluid ports.

7. The system of claim 4, further comprising a plug in one of the respective chamber openings.

8. The system of claim 3, wherein the first chamber includes a first chamber opening arranged in the chamfer and the second chamber includes a second chamber opening arranged in an outer side surface of the connector base portion.

9. The system of claim 8, wherein the base includes a fluid port and when the connector is engaged with the base, the first chamber opening is arranged to allow fluid to flow from the first chamber opening into a chamber between the connector and the base and out of the fluid connector mechanism through the fluid port.

10. The system of claim 1, wherein the base further includes a port positioned between the first pair of grooves, and when the connector is engaged with the base, a second chamber opening is arranged in fluid communication with the port.

11. The system of claim 1, wherein the base includes a groove arranged in an interior surface of the base and another O-ring in the groove.

12. The system of claim 1, wherein the first pair of grooves is arranged in a first interior surface of the base and the second pair of grooves is arranged in a second interior surface of the base.

13. The system of claim 12, wherein the first interior surface is opposite of the second interior surface.

14. The system of claim 1, wherein the connector base portion includes a first chamfer and the base includes a second chamfer and wherein when the connector base portion is inserted into the base, the first chamfer is configured to engage with the second chamfer and thereby self-align the connector with the base.

15. The system of claim 14, wherein the first chamfer is an outer chamfer, the connector base portion includes a third chamfer that is an interior chamfer, and the base includes a fourth chamfer and wherein when the connector base portion is inserted into the base, the third interior chamfer is configured to engage with the fourth chamfer and thereby self-align the connector with the base.

16. The system of claim 15, wherein the third chamfer is arranged to enable load distribution during operation and prevents the first and second pairs of O-rings from slipping out of the first and second pairs of grooves.

17. The system of claim 1, wherein the connector is configured for a blind mate connection with the base.

18. The system of claim 1, further comprising a balloon, and wherein the base portion is connected to a structure which is connected to a fill port of the balloon, and in operation, lift gas is provided to the fill port via the opening and the structure.

* * * * *